(12) United States Patent
Uskert et al.

(10) Patent No.: US 9,745,856 B2
(45) Date of Patent: Aug. 29, 2017

(54) PLATFORM FOR CERAMIC MATRIX COMPOSITE TURBINE BLADES

(71) Applicants: Rolls-Royce North American Technologies, Inc., Indianapolis, IN (US); Rolls-Royce Corporation, Indianapolis, IN (US)

(72) Inventors: Richard C. Uskert, Timonium, MD (US); Matthew P. Basiletti, Lafayette, IN (US); David J. Thomas, Brownsburg, IN (US); Ted J. Freeman, Danville, IN (US); Michelle L. Tucker, Plainfield, IN (US)

(73) Assignees: Rolls-Royce Corporation, Indianapolis, IN (US); Rolls-Royce North American Technologies, Inc., Indianapolis, IN (US)

(*) Notice: Subject to any disclaimer, the term of this patent is extended or adjusted under 35 U.S.C. 154(b) by 817 days.

(21) Appl. No.: 14/144,795

(22) Filed: Dec. 31, 2013

(65) Prior Publication Data

US 2015/0247414 A1    Sep. 3, 2015

Related U.S. Application Data

(60) Provisional application No. 61/780,764, filed on Mar. 13, 2013.

(51) Int. Cl.
*F01D 5/22* (2006.01)
*F01D 5/30* (2006.01)
(Continued)

(52) U.S. Cl.
CPC ........... *F01D 5/3084* (2013.01); *F01D 5/225* (2013.01); *F01D 5/282* (2013.01); *F01D 5/3007* (2013.01); *F01D 5/3092* (2013.01); *F01D 11/008* (2013.01); *F05D 2240/55* (2013.01); *F05D 2240/80* (2013.01); *F05D 2260/96* (2013.01);
(Continued)

(58) Field of Classification Search
CPC ........ F01D 5/225; F01D 5/282; F01D 5/3007; F01D 5/3084; F01D 5/3092; F01D 11/008
See application file for complete search history.

(56) References Cited

U.S. PATENT DOCUMENTS 3,784,320 A    1/1974  Rossmann et al.
4,019,832 A    4/1977  Salemme et al.
(Continued)

FOREIGN PATENT DOCUMENTS

EP    1992786 A2    11/2008
EP    2189626 A1    5/2010
FR    2608674 A1    6/1988

OTHER PUBLICATIONS

International Search Report, International Application PCT/US2013/078423, Dec. 11, 2014, 4 pages.
(Continued)

*Primary Examiner* — Woody Lee, Jr.
(74) *Attorney, Agent, or Firm* — Barnes & Thornburg LLP

(57) ABSTRACT

The present disclosure provides for a turbine wheel having a blade platform disposed to compliantly secure ceramic turbine blades to a rotatable disk. The platform includes opposing ends to engage a portion of an airfoil of each turbine blade and radial extensions to engage a portion of a root of each turbine blade.

20 Claims, 2 Drawing Sheets

(51) Int. Cl.
*F01D 5/28* (2006.01)
*F01D 11/00* (2006.01)

(52) U.S. Cl.
CPC ..... *F05D 2300/6033* (2013.01); *Y02T 50/672* (2013.01); *Y02T 50/673* (2013.01); *Y10T 29/49321* (2015.01)

(56) References Cited

U.S. PATENT DOCUMENTS

| | | | |
|---|---|---|---|
| 4,169,694 A | 10/1979 | Sanday | |
| 4,471,008 A | 9/1984 | Hurther et al. | |
| 4,743,166 A | 5/1988 | Elston et al. | |
| 4,802,824 A * | 2/1989 | Gastebois | F01D 5/282 416/193 A |
| 5,160,243 A | 11/1992 | Herzner et al. | |
| 5,240,375 A | 8/1993 | Wayte | |
| 5,275,536 A | 1/1994 | Stephens et al. | |
| 5,277,548 A | 1/1994 | Klein et al. | |
| 5,791,877 A * | 8/1998 | Stenneler | F01D 5/22 416/204 A |
| 6,132,175 A | 10/2000 | Cai et al. | |
| 6,290,466 B1 | 9/2001 | Ravenhall et al. | |
| 6,375,429 B1 * | 4/2002 | Halila | F01D 5/10 416/190 |
| 6,398,499 B1 | 6/2002 | Simonetti et al. | |
| 6,547,526 B2 * | 4/2003 | Van Daam | B22F 5/04 416/190 |
| 6,619,924 B2 | 9/2003 | Miller | |
| 6,860,722 B2 | 3/2005 | Forrester et al. | |
| 7,326,035 B2 | 2/2008 | Rodrigues et al. | |
| 7,972,113 B1 * | 7/2011 | Davies | F01D 5/025 416/214 A |
| 8,016,565 B2 | 9/2011 | Berg et al. | |
| 2007/0020102 A1 | 1/2007 | Beeck et al. | |
| 2007/0048142 A1 | 3/2007 | Dambrine et al. | |
| 2009/0016890 A1 | 1/2009 | Douguet et al. | |
| 2009/0060745 A1 | 3/2009 | Douguet et al. | |
| 2012/0082551 A1 | 4/2012 | Macchia et al. | |

OTHER PUBLICATIONS

Written Opinion of the International Searching Authority, International Application PCT/US2013/078423, Sep. 13, 2015, 7 pages.

* cited by examiner

PLATFORM FOR CERAMIC MATRIX COMPOSITE TURBINE BLADES

CROSS REFERENCE TO RELATED APPLICATIONS

This application claims priority to and the benefit of U.S. Provisional Patent Application No. 61/780,764, filed 13 Mar. 2013, the disclosure of which is now expressly incorporated herein by reference.

GOVERNMENT RIGHTS

The present application was made with the United States government support under Contract No. FA8650-07-C-2803. The United States government may have certain rights in the present application.

TECHNICAL FIELD

The present invention generally relates to a turbine wheel assembly for ceramic matrix composite turbine engine blades, and more particularly to a turbine wheel assembly including a platform to compliantly secure the ceramic turbine blades to the turbine disk.

BACKGROUND

Using ceramic matrix composite (CMC) material in turbine blades is desirable due to lower density and higher temperature material properties relative metal alloy based materials. Present approaches retaining CMC turbine blades suffer from a variety of limitations and disadvantages relative to certain applications. Accordingly, there is a need for further contributions to this technology.

SUMMARY

One embodiment of the present invention is a unique gas turbine engine component, such as a blade platform that is formed separately from a composite blade. Other embodiments include apparatuses, systems, devices, hardware, methods, and combinations for the same. Further embodiments, forms, features, aspects, benefits, and advantages of the present application shall become apparent from the description and figures provided herewith.

DETAILED DESCRIPTION OF THE ILLUSTRATIVE EMBODIMENTS

Figure 1:
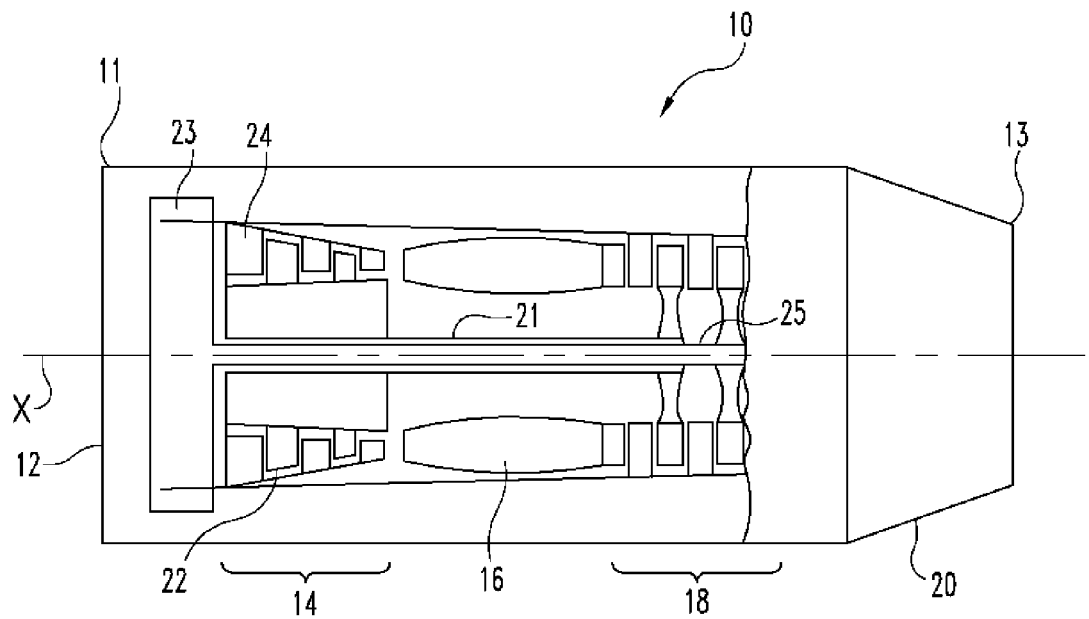
FIG. 1 is a schematic representation of a gas turbine engine.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

The present disclosure defines a turbine wheel assembly having a plurality of blade platforms made from a high temperature capable metal or metal alloy that provides a compliant interface between turbine blades made from a ceramic based material and a metallic rotatable disk. The blade platforms form a portion of an inner wall of a fluid flow path through the turbine. The blade platforms can also be configured to prevent direct and abrasive contact between the turbine blades and the turbine disk. Further, separate blade platforms eliminate the need for integrated ceramic composite platforms formed as part of each turbine blade as is typically done with CMC turbine blade design. Elimination of an integrated CMC platform reduces the weight of the turbine blade and therefore reduces induced stress caused by centripetal forces at high speed rotational operation of the turbine wheel.

The blade platform can be made from any suitable high temperature capable metal or metal alloy such as nickel based alloys. The blade platforms can be cast, milled, forged or otherwise formed to compliantly hold the turbine blades in slots formed in the turbine disk. The blade platforms can include one or more dampers to facilitate dynamic damping of turbine blades during periods of high cycle frequency induced vibrations. High temperature seals can also be utilized with the blade platforms to discourage fluid flow leakage from the fluid flow path through gaps between the blade platforms and the turbine blades. In this manner the present disclosure provides an apparatus and method for minimizing contact stress and abrasive wear on the CMC turbine blades thereby increasing the turbine blade operational life and reducing costs associated with repair or replacement of CMC turbine blades.

With reference to FIG. 1, there is illustrated a schematic representations of one form of an aircraft engine 10 used as a power plant for an aircraft. While the gas turbine engine is illustrated with two spools (i.e. two shafts connecting a turbine with a compressor and a fan), it should be understood that the present invention is not limited to any particular engine design or configuration and as such may be used in single or multi spool engines of the aero or power generation type. The gas turbine engine 10 will be described generally, however significant details regarding general gas turbine engines will not be presented herein as it is believed that the theory of operation and general parameters of gas turbine engines are well known to those of ordinary skill in the art.

As used herein, the term "aircraft" includes, but is not limited to, helicopters, airplanes, unmanned space vehicles, fixed wing vehicles, variable wing vehicles, rotary wing vehicles, unmanned combat aerial vehicles, tailless aircraft, hover crafts, and other airborne and/or extraterrestrial (spacecraft) vehicles. Further, aspects of the present disclosure are contemplated for utilization in other applications that may not be coupled with an aircraft such as, for example, industrial applications, power generation, pumping sets, naval propulsion, weapon systems, security systems, perimeter defense/security systems, and the like known to one of ordinary skill in the art.

As shown in FIG. 1, a gas turbine engine 10 generally possesses a forward end 11 and an aft end 13 with its several components following inline therebetween. An air inlet or intake 12 is at a forward end 11 of the engine and may have an integral particle separator (not shown) incorporated therein. Moving toward the aft end 13, in order, the intake 12 is followed by a compressor section 14, a combustion section 16, a turbine section 18, and a nozzle or exhaust section 20 at the aft end 13 of the engine. It will be readily apparent to those skilled in the art that additional components may also be included in the engine, such as, for example, low-pressure and high-pressure compressors, high-pressure and low-pressure turbines, and an external shaft. This, however, is not an exhaustive list.

In operation, air is drawn in through the inlet 12 and compressed in the compressor section 14 to a high pressure relative to ambient pressure of the gas turbine engine 10. The compression section 14 includes plurality of stages with rotating blades 22 that operate to compress working fluid and vanes 24 positioned upstream of rotating blades 22 to control aerodynamic properties of the working fluid entering into the rotating stage.

The compressed air is mixed with fuel in the combustor section 16 wherein the fuel/air mixture burns and produces a high temperature and pressure working fluid from which the turbine section 18 extracts power. The turbine section 18 is mechanically coupled to the compressor section 14 via a shaft 21, which rotates about a longitudinal centerline axis X that extends axially along the longitudinal axis of the engine 10. As the turbine section 18 rotates due to the forces generated by the high pressure working fluid, the compressor section 14 is rotatingly driven by the turbine section 18 via the shaft 21 to produce compressed air. A portion of the power extracted from the turbine section 18 can be utilized to drive a second device 23 through a second shaft 25, such as a fan, an electrical generator, gas compressor or pump and the like.

As used herein, the terms "axial" or "axially" refer to a dimension along a longitudinal centerline axis X of an engine 10. The term "forward" used in conjunction with "axial" or "axially" refers to moving in a direction toward the engine forward end 11 or the engine inlet 12, or a component being relatively closer to the engine forward end 11 or the engine inlet 12 as compared to another component. The term "aft" used in conjunction with "axial" or "axially" refers to moving in a direction toward the engine aft end 13 or the engine exhaust section 20, or a component being relatively closer to the engine aft end 13 or the engine exhaust section 20 as compared to another component.

A typical gas turbine engine 10 may also be considered to have an outer circumference, as they are typically cylindrical in shape. As used herein, the terms "radial" or "radially" refer to a dimension extending between a longitudinal centerline axis X of the engine and an engine outer circumference. The use of the terms "proximal" or "proximally," either by themselves or in conjunction with the terms "radial" or "radially," refers to moving in a direction toward the longitudinal centerline axis X, or a component being relatively closer to the longitudinal centerline axis X as compared to another component. The use of the terms "distal" or "distally," either by themselves or in conjunction with the terms "radial" or "radially," refers to moving in a direction away from the longitudinal centerline axis X and toward the engine outer circumference, or a component being relatively farther away from the longitudinal centerline axis X and closer to the engine outer circumference as compared to another component.

As used herein, the terms "circumferential" or "circumferentially" refer to a dimension that is perpendicular to both the axial and radial dimensions.

Figure 2:
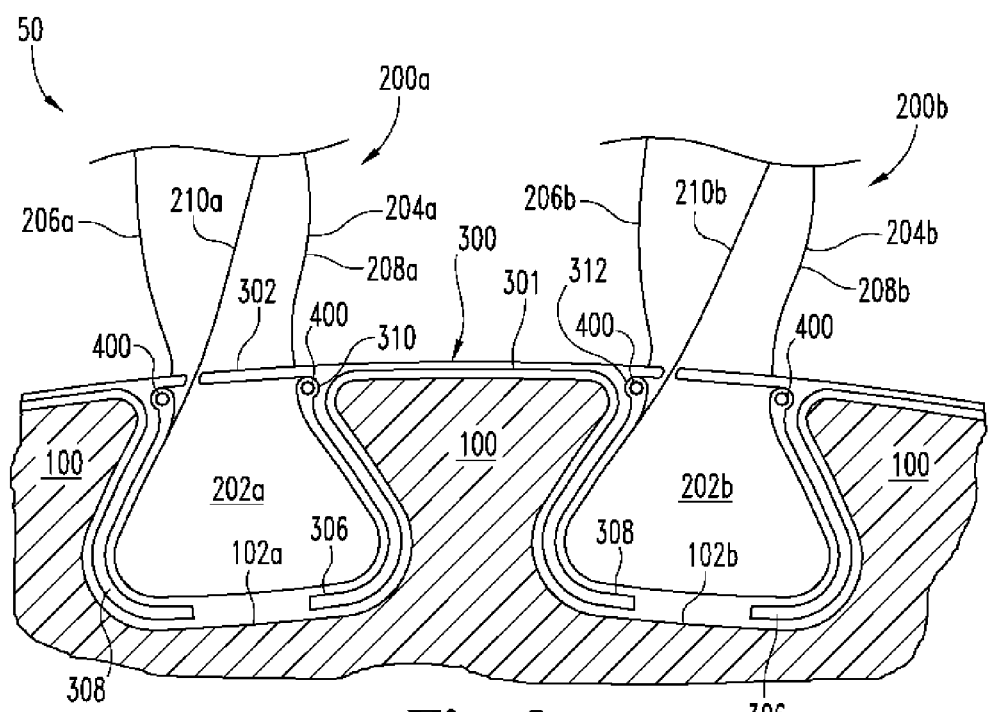
FIG. 2 is a axial end view of an embodiment of the present disclosure.
Figure 3:
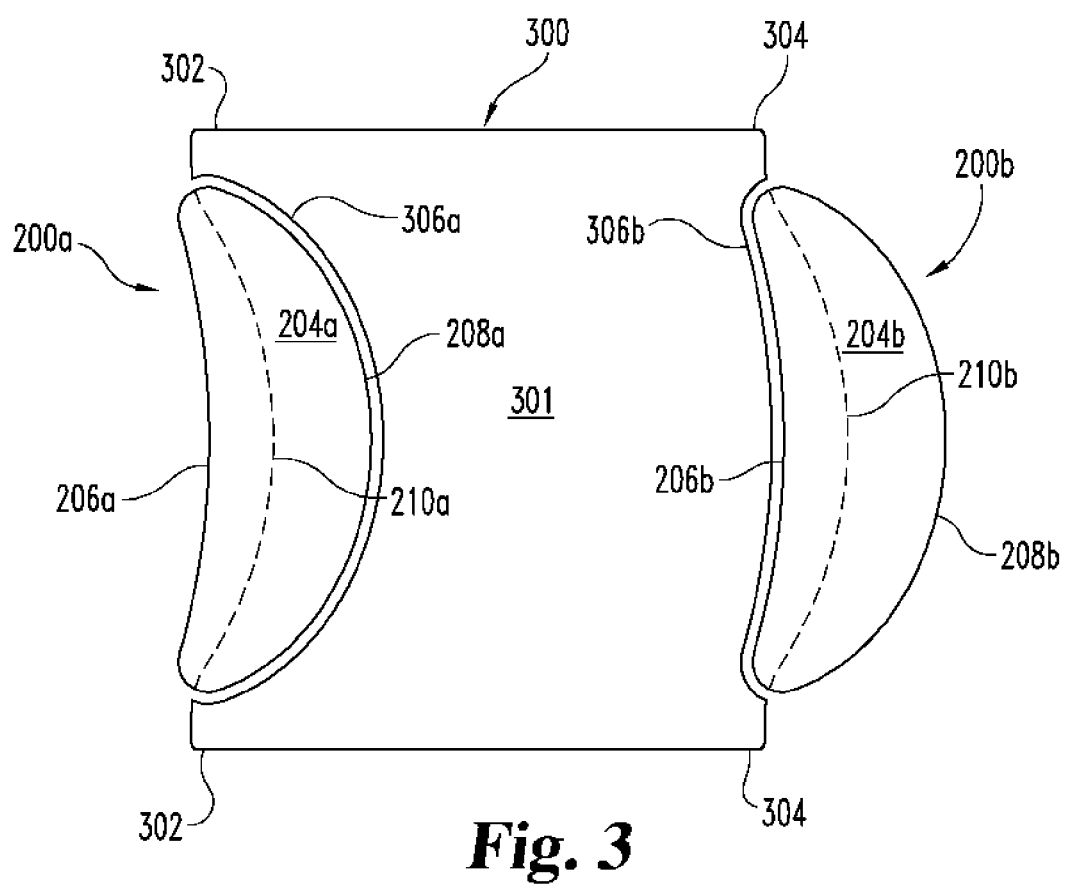
FIG. 3 is a radially-inward view of an embodiment of the present disclosure.

Referring now to FIGS. 2 and 3, an example apparatus 50 is provided with a disk 100 having a plurality of airfoil slots 102a, 102b. As shown, the disk 100 is provided with a first airfoil slot 102a, and a second airfoil slot 102b. These slots 102a, 102b may be geometrically configured to accept a pair of airfoils 200a, 200b. Specifically, these slots 102a, 102b may be geometrically configured to accept an airfoil root 202a, 202b such as a dovetail of their respective airfoils. It should be noted the slots of the disks and the roots of the blades are illustrated as a dovetail configuration, however other radial locking configurations such as "fir tree" designs are contemplated by the present disclosure.

The airfoils 200a, 200b may be made of a composite material such as of a ceramic matrix composite, as they are suitable for operational use in the high pressure and high temperature internal operating environment of a gas turbine engine. In addition to being provided with roots 202a, 202b, the airfoils 200a, 200b are provided with blades 204a, 204b that extend radially outward from the roots 202a, 202b. Each blade 204a, 204b has a pressure side surface 206a, 206b, a suction side surface 208a, 208b, and a mean camber line 210a, 210b, respectively.

A blade platform 300 defines an inner aerodynamic gas path surface at a hub of the turbine blades. The blade platform 300 may be a two-dimensional or three-dimensional metallic sheet and may be cast, milled, or otherwise formed to a desired contour. The blade platform 300 is a compliant, high temperature capable, metallic platform having a contoured gas path sheet 301 with contoured axial extensions or tabs 302, 304 and radial extensions 306, 308 engageable with portions of the roots 202a, 202b and the disk 100. The platform sheet 301 is disposed between the first and second airfoils 200a, 200b. The platform sheet 301 includes opposing end walls 306a and 306b that conform to the shape of the aerodynamic surfaces of the airfoils' 200a, 200b axially and circumferentially.

The first axial extension 302 can extend adjacent to and conform with the suction side surface 208a of the first airfoil 200a. The first axial extension 302 can also extend axially fore and aft of the first airfoil 200a and circumferentially to a mean camber line 210a of the first airfoil 200a. The second axial extension 304 can extend adjacent to and conform with the pressure side 206b of the second airfoil 200b. The second axial extension 304 can also extend axially fore and aft of the second airfoil 200b and circumferentially to a mean camber line 210b of the second airfoil 200b.

The first and second radial extensions 306, 308 (shown in FIG. 2) extend radially inward from the platform sheet 301 and into corresponding slots 102a, 102b of the disk 100. The first and second radial extensions 306, 308 can conform with the shape of portions of an outer wall of the corresponding slots 102a, 102b of the disk 100. Furthermore, the first and second radial extensions 306, 308 can conform with portions of the roots 202a, 202b of their respective airfoils 200a, 200b such that the airfoils 200a, 200b can be compliantly held within the slots 102a, 102b of the disk 100.

A first groove 310 (shown in FIG. 2) may be disposed between the first axial extension 302 and the first radial extension 306, with the first groove 310 housing a sealing dynamic damper 400. A second groove 312 may be disposed between the second axial extension 304 and the second radial extension 308, with the second groove 312 housing a sealing dynamic damper 400. The grooves 310, 312 are adjacent to and follow the contour of their respective airfoils 200a, 200b.

One aspect of the present disclosure includes an apparatus comprising: a disk having at least a first airfoil slot and a second airfoil slot; a first ceramic matrix composite airfoil coupled to the disk and mounted within the first slot; a second ceramic matrix composite airfoil coupled to the disk and mounted within the second slot; a platform disposed between the first airfoil and the second airfoil; the platform comprising a first axial extension and a second axial extension, and further comprising a first radial extension and a second radial extension; the first axial extension extending adjacent to the first airfoil and extending axially fore and aft of the first airfoil; the second axial extension extending adjacent to the second airfoil and extending axially fore and aft of the second airfoil; the first radial extension extending radially into and conforming to the first slot; the second radial extension extending radially into and conforming to the second slot.

A first refinement of the present disclosure provides that the first axial extension conforms to a suction side of the first airfoil.

Another refinement of the present disclosure provides that the second axial extension conforms to a pressure side of the second airfoil.

Another refinement of the present disclosure provides that the first axial extension at least extends circumferentially to a mean camber line of the first airfoil.

Yet another refinement of the present disclosure provides that the second axial extension at least extends circumferentially to a mean camber line of the second airfoil.

Yet another refinement of the present disclosure provides a first groove disposed between the first axial extension and the first radial extension, with the first groove housing a first sealing dynamic damper.

Yet another refinement of the present disclosure provides a second groove disposed between the second axial extension and the second radial extension, with the second groove housing a second sealing dynamic damper.

Another refinement of the present disclosure provides that the first radial extension extends radially proximal of the first airfoil toward a center of the disk, and conforms and wraps around a proximal end of the first airfoil.

Yet another refinement of the present disclosure provides that the second radial extension extends radially proximal of the second airfoil toward a center of the disk, and conforms and wraps around a proximal end of the second airfoil.

Yet another refinement of the present disclosure further provides the platform with a contoured gas path sheet disposed between the first and second airfoils, that further conform to an aerodynamic shape of the first and second airfoils both axially and circumferentially.

Another aspect of the present disclosure includes a turbine wheel assembly comprising: a plurality of turbine blades including a root portion and an airfoil extending from the root portion, the airfoil having a pressure side surface and a suction side surface extending between a leading edge and a trailing edge of the airfoil; a rotatable disk having a plurality of slots formed to receive the root portion of the plurality of turbine blades; a plurality of blade platforms extending between adjacent slots of the disk, each platform including a pair of opposing walls conforming to the suction side surface of one turbine blade and the pressure side surface of an adjacent turbine blade respectively; a pair of forward and aft axial tabs extending from end portions of the opposing walls at least partially across the leading edge and trailing edge of the adjacent turbine blades respectively; and a pair of legs extending radially inward from each of the opposing walls of the blade platform into a portion of a pair of adjacent slots in the rotatable disk.

Another aspect of the present disclosure includes a blade platform for compliantly coupling a ceramic turbine blade to a rotatable disk comprising: a pair of opposing walls conforming to a suction side surface and a pressure side surface of an adjacent pair of turbine blades, respectively; a pair of forward and aft axial tabs extending from end portions of the opposing walls at least partially across the leading edge and trailing edge of the adjacent turbine blades; and a pair of legs extending radially inward from each of the opposing walls of the blade platform configured to compliantly engage a root portion of the adjacent turbine blades.

While the invention has been illustrated and described in detail in the drawings and foregoing description, the same is to be considered as illustrative and not restrictive in character, it being understood that only the preferred embodiments have been shown and described and that all changes and modifications that come within the spirit of the invention are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. An apparatus comprising:
   a disk having at least a first airfoil slot and a second airfoil slot;
   a first ceramic matrix composite airfoil coupled to the disk and mounted within the first slot;
   a second ceramic matrix composite airfoil coupled to the disk and mounted within the second slot;
   a platform disposed between the first airfoil and the second airfoil;
   the platform comprising a first axial extension and a second axial extension, and further comprising a first radial extension and a second radial extension;
   the first axial extension extending adjacent to the first airfoil and extending axially fore and aft of the first airfoil;
   the second axial extension extending adjacent to the second airfoil and extending axially fore and aft of the second airfoil;
   the first radial extension extending radially into and conforming to the first slot;
   the second radial extension extending radially into and conforming to the second slot; and
   further comprising a first groove disposed between the first axial extension and the first radial extension, wherein the first groove houses a first sealing dynamic damper.

2. The apparatus of claim 1, wherein the first axial extension conforms to a suction side of the first airfoil.

3. The apparatus of claim 1, wherein the second axial extension conforms to a pressure side of the second airfoil.

4. The apparatus of claim 1, wherein the first axial extension at least extends circumferentially to a mean camber line of the first airfoil.

5. The apparatus of claim 1, wherein the second axial extension at least extends circumferentially to a mean camber line of the second airfoil.

6. The apparatus of claim 1, further comprising a second groove disposed between the second axial extension and the second radial extension, wherein the second groove houses a second sealing dynamic damper.

7. The apparatus of claim 1, wherein the first radial extension extends radially inward from the first airfoil toward a center of the disk, and conforms and wraps around a proximal end of the first airfoil.

8. The apparatus of claim 1, wherein the second radial extension extends radially inward from the second airfoil toward a center of the disk, and conforms and wraps around a proximal end of the second airfoil.

9. The apparatus of claim 1, wherein the platform further comprises a contoured gas path sheet disposed between the first and second airfoils, and further conforming to an aerodynamic shape of the first and second airfoils both axially and circumferentially.

10. A turbine wheel assembly comprising:
a plurality of turbine blades including a root portion and an airfoil extending from the root portion, the airfoil having a pressure side surface and a suction side surface extending between a leading edge and a trailing edge of the airfoil;
a rotatable disk having a plurality of slots formed to receive the root portion of the plurality of turbine blades;
a plurality of blade platforms extending between adjacent slots of the disk, each platform including a pair of opposing walls conforming to the suction side surface of one turbine blade and the pressure side surface of an adjacent turbine blade respectively;
a pair of forward and aft axial tabs extending from end portions of the opposing walls at least partially across the leading edge and trailing edge of the adjacent turbine blades respectively;
a pair of legs extending radially inward from each of the opposing walls of the blade platform into a portion of a pair of adjacent slots in the rotatable disk; and
a pair of sealing dynamic dampers disposed in a groove formed between each forward and aft axial tab and each leg.

11. The turbine wheel assembly of claim 10, wherein the plurality of blade platforms forms a contoured inner fluid flow path through a section of the turbine wheel.

12. The turbine wheel assembly of claim 10, further comprising:
a fluid seal positioned between the blade platform and each of the turbine blades to discourage fluid flow between gaps formed in an interface between the turbine blades and the corresponding platforms.

13. The turbine wheel assembly of claim 10 wherein the pair of sealing dynamic dampers are positioned between the blade platform and each of the turbine blades.

14. The turbine wheel assembly of claim 10, wherein each leg of the blade platform is configured to substantially conform to a shape of a corresponding slot in the disk.

15. The turbine wheel assembly of claim 14, wherein each leg of the blade platform is configured to substantially conform to a shape of a root of a corresponding turbine blade.

16. The turbine wheel assembly of claim 10, wherein the blade platforms are configured to compliantly hold the turbine blades and prevent direct contact between the turbine blades and the turbine disk.

17. The turbine wheel assembly of claim 10, wherein the turbine blades are made from a ceramic composite material.

18. The turbine wheel assembly of claim 10, wherein the axial tabs terminate at a corresponding mean camber line of the leading and trailing edges of the turbine blades.

19. A blade platform for compliantly coupling a ceramic turbine blade to a rotatable disk comprising:
a pair of opposing walls conforming to a suction side surface and a pressure side surface of an adjacent pair of turbine blades, respectively;
a pair of forward and aft axial tabs extending from end portions of the opposing walls at least partially across the leading edge and trailing edge of the adjacent turbine blades;
a pair of legs extending radially inward from each of the opposing walls of the blade platform configured to compliantly engage a root portion of the adjacent turbine blades; and
a pair of sealing dynamic dampers disposed in a groove formed between each forward and aft axial tab and each leg.

20. A method of making a turbine wheel assembly comprising:
forming a rotatable disk with a plurality of shaped slots;
forming a blade platform with a pair of opposing walls conforming to a suction side surface of a first turbine blade and a pressure side surface of a second turbine blade, the platform further including axial tabs extending across the leading edge and trailing edge of each turbine blades and terminating at a mean camber line of the airfoil, the platform further including a plurality of legs extending radial inward being engageable with the slots in the rotatable disk;
the platform further including a sealing dynamic dampers located in grooves between the axial tabs and the plurality of legs;
engaging a plurality of ceramic matrix composite turbine blades with the blade platform to form a turbine blade platform subassembly; and
sliding the turbine blade platform subassembly in an axial direction to engage with the slots of the rotatable disk.

\* \* \* \* \*